US007000376B2

(12) United States Patent
Barisione et al.

(10) Patent No.: US 7,000,376 B2
(45) Date of Patent: Feb. 21, 2006

(54) GAS TURBINE CONTROL SYSTEM

(75) Inventors: Mario Barisione, Arenzano (IT); Stefano Cacciacarne, Genoa (IT); Marco Torlai, Genoa (IT)

(73) Assignee: Ansaldo Energia S.p.A., Genoa (IT)

(*) Notice: Subject to any disclaimer, the term of this patent is extended or adjusted under 35 U.S.C. 154(b) by 0 days.

(21) Appl. No.: 10/968,344

(22) Filed: Oct. 20, 2004

(65) Prior Publication Data

US 2005/0097879 A1     May 12, 2005

(30) Foreign Application Priority Data

Oct. 21, 2003   (IT)   .......................... TO2003A0828

(51) Int. Cl.
*F02C 9/28*    (2006.01)
(52) U.S. Cl. ..................................... 60/39.281; 60/243
(58) Field of Classification Search ............... 60/39.27, 60/39.281, 243
See application file for complete search history.

(56) References Cited

U.S. PATENT DOCUMENTS

| 3,638,422 | A | * | 2/1972 | Loft et al. ............... 60/39.281 |
| 5,252,860 | A | * | 10/1993 | McCarty et al. .......... 290/40 R |
| 5,581,995 | A | | 12/1996 | Lucenko et al. |
| 6,164,057 | A | * | 12/2000 | Rowen et al. ............. 60/39.27 |
| 6,278,262 | B1 | | 8/2001 | Ullyott |
| 2002/0043067 | A1 | | 4/2002 | Maeda et al. |
| 2002/0104308 | A1 | | 8/2002 | Dud, Jr. et al. |
| 2003/0041599 | A1 | | 3/2003 | Moser |

FOREIGN PATENT DOCUMENTS

EP     0 377 292     7/1990

* cited by examiner

*Primary Examiner*—Louis J. Casaregola
(74) *Attorney, Agent, or Firm*—Berenato, White & Stavish

(57) ABSTRACT

A control system for a gas turbine, wherein a number of regulators generate respective control signals selectable to regulate fuel supply to a combustion chamber of the gas turbine. The regulators include at least one speed/load regulator, wherein a first and a second regulating block, separate from each other, generate respective control signals which are selectable to perform speed control of the turbine and load control of the turbine.

11 Claims, 2 Drawing Sheets

GAS TURBINE CONTROL SYSTEM

The present invention relates to a gas turbine control system.

SUMMARY OF THE INVENTION

It is an object of the present invention to provide a control system which is particularly compact and complete.

According to the present invention, there is provided a control system for a gas turbine, wherein a number of regulators generate respective control signals selectable to regulate fuel supply to a combustion chamber of said gas turbine; said regulators comprising at least one speed/load regulator receiving at least one first feedback signal related to the speed of said gas turbine, and at least one second feedback signal related to the power supplied by said gas turbine; characterized in that said speed/load regulator comprises a first regulating block, in particular a proportional-integral regulator, receiving a first error signal related to the difference between said first feedback signal and a reference speed value; said speed/load regulator also comprising a second regulating block, in particular a proportional-integral regulator, separate from the first regulating block and receiving a second error signal related to the difference between said second feedback signal and a reference load value; said speed/load regulator also comprising selecting means for selecting the output of said first regulating block during a control step of the speed of said gas turbine, and for selecting said second regulating block during a control step of the load of said gas turbine.

BRIEF DESCRIPTION OF THE DRAWINGS

A preferred, non-limiting embodiment of the invention will be described by way of example with reference to the accompanying drawings, in which.

DETAILED DESCRIPTION OF THE INVENTION

Figure 1:
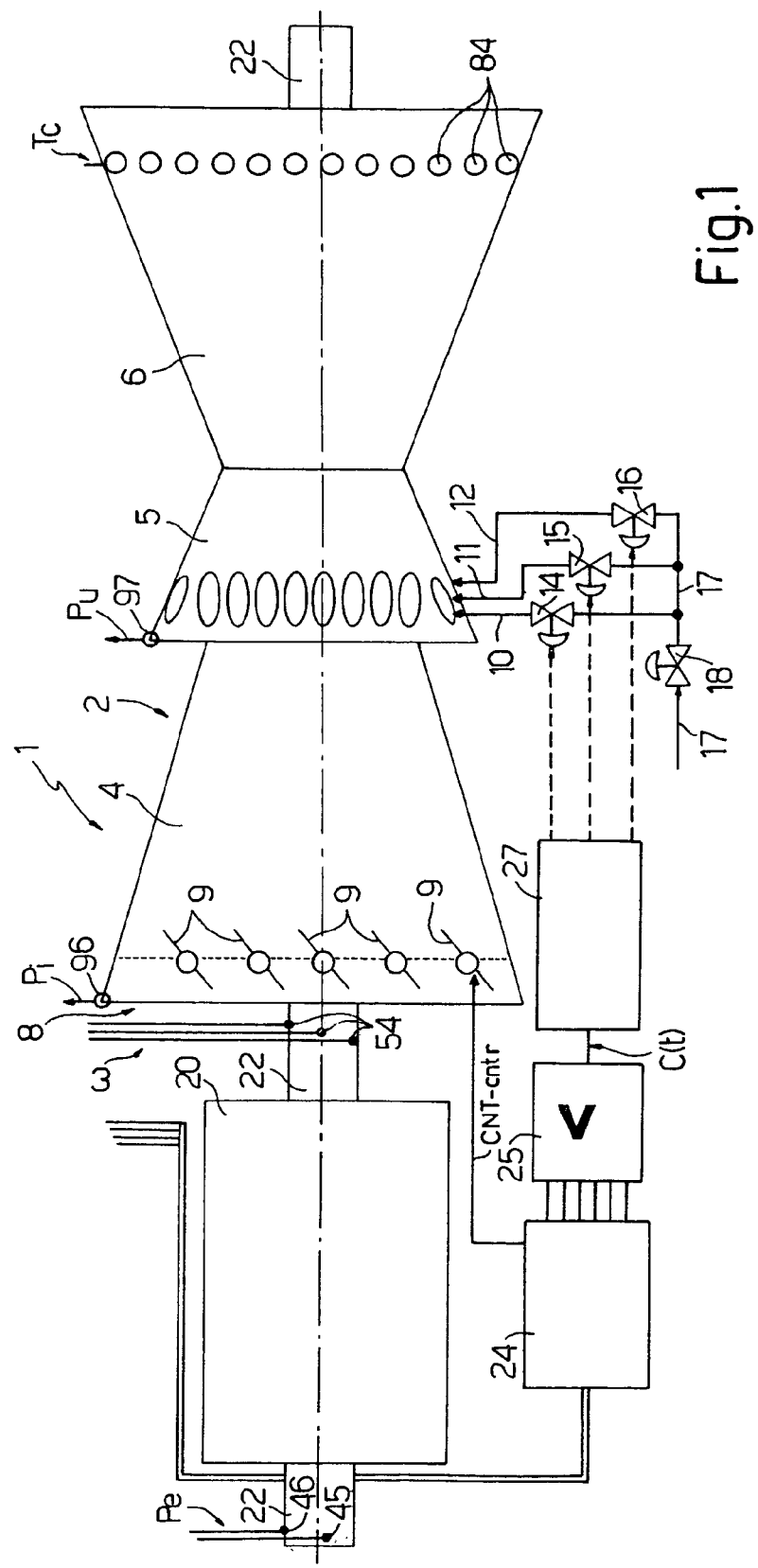
FIG. 1 shows, schematically, a gas turbine featuring the control system according to the present invention.

Number 1 in FIG. 1 indicates as a whole a control system for a gas turbine 2. More specifically, gas turbine 2 (known) comprises a compressor stage 4, a combustion chamber 5, and a turbine 6. More specifically, compressor stage 4 has an intake opening 8 fitted with a number of powered vane regulators 9 for modifying airflow into gas turbine 2. Combustion chamber 5 is typically fitted with three different types of burners (diffusion, pre-mix and pilot burners—not shown) supplied by three different feed lines 10, 11, 12 fitted with respective servovalves 14, 15, 16. Feed lines 10, 11, 12 also communicate, in the example shown, with a common fuel (gas) feed line 17 fitted with an on-off valve 18. Gas turbine 2 drives an electric generator 20 fitted to the same shaft 22 as gas turbine 2.

Control system 1 mainly comprises a number of regulators 24 (described in detail later on); and a selecting device 25, which receives the output signals generated by the individual regulators, and supplies the lowest-value input signal to generate a control signal C(t). The regulators (as also explained in detail later on) receive measuring signals related to:

the electric power Pe produced by electric generator 20;
the rotation speed ω of shaft 22 of gas turbine 2;
the pressure Pi at the inlet of compressor stage 4;
the pressure Pu at the outlet of compressor stage 4; and
the temperature Tc measured at the exhaust of turbine 6.

Regulators 24 also generate a control signal CNT_cntr for regulating the opening of vane regulators 9.

A fuel proportioner 27 (known) is also provided, which receives control signal C(t), generates control signals for respective servovalves 14, 15, 16, and divides the flow demand expressed by control signal C(t) between the three servovalves 14, 15, 16.

Figure 2:
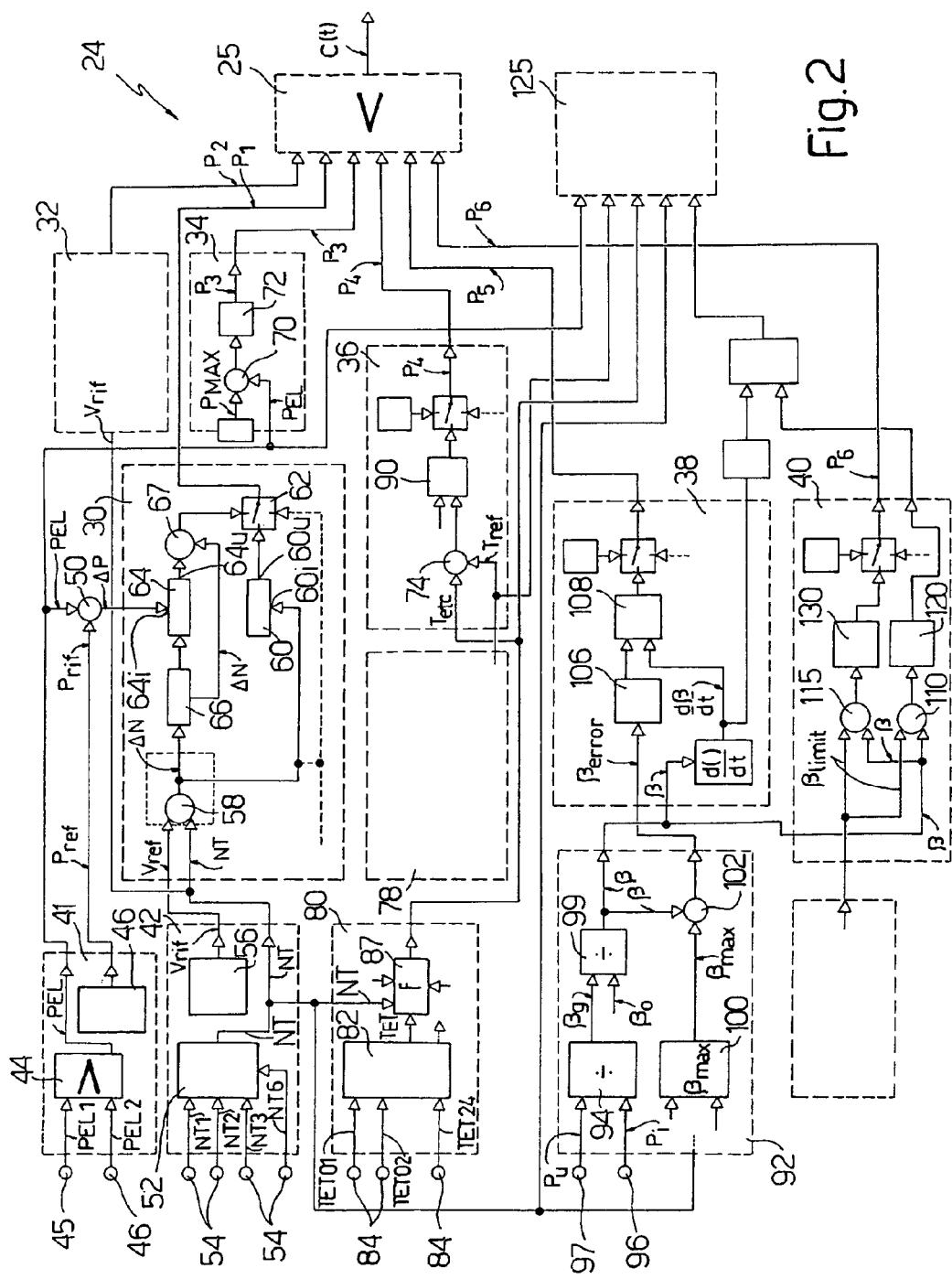
FIG. 2 shows the FIG. 1 control system in more detail.

Regulators 24 are shown in more detail in FIG. 2.

More specifically, regulators 24 comprise:

a speed/load regulator 30 generating a first control signal P1;
a start-up regulator 32 generating a second control signal P2;
a load-limiting regulator 34 generating a third control signal P3;
a temperature regulator 36 generating a fourth control signal P4;
a compression ratio regulator 38 generating a fifth control signal P5; and
a turbine cooling air regulator 40 generating a sixth control signal P6.

Control signals P1, P2, P3, P4, P5, P6 are sent to the input of selecting device 25, which, by means of known techniques, selects the lowest-value input signal P1, P2, P3, P4, P5, P6, and so generates signal C(t).

Speed/load regulator 30 cooperates with a load block 41 and a speed block 42.

More specifically, load block 41 comprises a block 44, which receives a first signal PEL1 generated by a sensor 45 fitted to generator 20, and a second signal PEL2 generated by a sensor 46 also fitted to generator 20. Signals PEL1, PEL2 represent two different measurements of the electric power Pe produced by generator 20 and (since electric power Pe is proportional to the power produced by gas turbine 2) of the mechanical power produced by turbine 2. Block 44 supplies the greater PEL of input signals PEL1, PEL2, so that, in the event of any discrepancy between signals PEL1, PEL2, the higher-value signal is selected to avoid underestimating the electric power generated.

Load block 41 also comprises a block 46 storing an electric power reference signal Pref, and also cooperates with a comparing block 50, in which the electric power reference signal Pref and signal PEL are added with opposite signs to generate an error signal ΔP representing the difference between the desired (reference) electric power and the electric power actually produced.

Speed block 42 comprises a block 52, which receives six signals NT1, NT2, NT3, NT4, NT5, NT6 generated by respective sensors 54 for measuring the rotation speed of shaft 22 of turbine 2.

Block 52 generates a single signal NT representing the rotation speed of gas turbine 2.

More specifically, block 52 performs the following operations:

each input signal is compared with another, different, input signal, and the lower-value signal of the two is selected;
the highest-value signal is extracted from the selected signals; and
the extracted signal represents signal NT.

Speed block 42 also comprises a block 56 storing a speed reference signal Vref.

Speed/load regulator 30 comprises a comparing block 58, in which the speed reference signal Vref and signal NT are added with opposite signs to generate an error signal ΔN representing the difference between the desired (reference) rotation speed and the actual measured rotation speed of gas turbine 2.

Speed/load regulator 30 comprises a first proportional-integral (PI) regulator 60, which has an input 60i receiving error signal ΔN, and an output 60u which communicates with an output of speed/load regulator 30 via a selector 62.

Speed/load regulator 30 comprises a second proportional-integral (PI) regulator 64, which has an input 64i receiving error signal ΔP from comparing block 50, and an output 64u which communicates with the output of speed/load regulator 30 via selector 62. PI regulator 64 has gain parameters which are modified as a function of error signal ΔN.

This function is represented schematically by a block 66, which receives error signal ΔN and acts on PI regulator 64.

More specifically, as error signal ΔN increases, the gain coefficients kp and Ki of proportional-integral PI regulator 64 decrease.

As an alternative to gain control as described above, error signal ΔN may be added (opposite in sign) to error signal ΔP, so that the overall difference signal is supplied to PI regulator 64; in which case, the signal (ΔP−ΔN) supplied to regulator 64 decreases as the error (ΔN) in the speed signal increases.

Block 66 also supplies a signal, proportional to error signal ΔN (or to derivative $d(\Delta N)/d(t)$), directly to the output (adding block 67) of regulator 64 to speed up response of regulator 64 to a deviation in rotation speed with respect to the reference speed. As can be seen, regulators 60 and 64 are separate from each other.

As will be made clear later on, selector 62 selects the output of PI regulator 60 at a first start-up step of gas turbine 2, in which speed is regulated; and, upon a given speed being reached, and following electric mains connection, selector 62 selects the output of PI regulator 60 to regulate load.

Start-up regulator 32 is known and therefore not described in detail. Regulator 32 receives reference signal Vref, and accordingly generates (e.g. by means of a mapped function) a ramp-increasing signal P2.

Load-limiting regulator 34 comprises a comparing block 70, which receives signal PEL representing the measured electric power, and a reference signal PMax representing a maximum operating power value. Load-limiting regulator 34 also comprises a proportional-integral regulator 72, which receives the output of comparing block 70 and generates the third control signal P3, which decreases as the difference between signal PEL and reference signal PMax increases.

Temperature regulator 36 comprises a comparing block 74, which receives, with opposite signs, a reference signal Tref generated in known manner by a block 78, and a signal Tetc representing the temperature measured at the turbine exhaust.

More specifically, signal Tetc is generated by a temperature acquisition block 80 comprising a first computing block 82, which receives a number of (in the example shown, 24) signals TET01, TET02, . . . TET24 generated by respective sensors 84 angularly spaced on an annular end portion of turbine 6 (FIG. 1). First computing block 82 calculates the average of input signals TET01, TET02, . . . TET24 to generate a signal TET which is supplied to a second computing block 87. Second computing block 87 also receives turbine rotation speed signal NT and information relative to the air temperature at the turbine inlet, and calculates the temperature Tetc at the turbine exhaust by means of a known formula f which processes the input parameters. As is known, the temperature inside the combustion chamber is too high (about 1100° C.) to be measured directly, so is measured indirectly by control system 1 measuring the exhaust gas temperature (sensors 84) which is in the region of 600–700° C.

Formula f in computing block 87 corrects the exhaust temperature average on the basis of current turbine rotation speed NT and the air temperature at the turbine inlet.

Regulator 36 comprises a proportional-integral (PI) block 90, which receives the error signal generated by comparing block 74, and so generates the fourth control signal P4.

Compression ratio regulator 38 cooperates with a pressure acquisition block 92, in which a first computing block 94 receives a first signal Pi (input pressure) generated by a pressure sensor 96 located at the inlet of compressor 4, and a second signal Pu (output pressure) generated by a pressure sensor 97 located at the outlet of compressor 4. First computing block 94 calculates the ratio between the second signal (Pu) and the first signal (Pi) to calculate a compression ratio βg. The calculated compression ratio βg is then supplied to a second computing block 99, which normalizes the calculated compression ratio by dividing βg by a reference value β° to obtain a normalized compression ratio β=βg/β° (hereinafter referred to as "compression ratio" for the sake of simplicity).

Pressure acquisition block 92 also comprises a third computing block 100, which receives a number of parameters (e.g. gas turbine rotation speed, position of vane regulators 9), and generates a maximum compression ratio value βmax. Compression ratio regulator 38 comprises a comparing block 102, in which the measured compression ratio β and maximum value βmax are added with opposite signs; and a proportional-integral (PI) block 106, which receives the error signal βerror generated by comparing block 102, and has an output communicating with a first input of an adding block 108. Adding block 108 also has a second input, which receives a signal proportional to the time derivative of measured compression ratio β; and the output of adding block 108 supplies the fifth control signal P5.

Turbine cooling air regulator 40 comprises a first comparing block 110, in which are added, with opposite signs, the measured compression ratio β value and a reference value βlimit generated in known manner by a respective block 111. Turbine cooling air regulator 40 also comprises a second comparing block 115, in which the measured compression ratio β value and reference value βlimit are added with opposite signs. The error at the output of first comparing block 110 is sent to a block 120, which performs a function F(x) generating a command to position vane regulators 9. More specifically, as the error increases, a command is generated to open vane regulators 9 to increase airflow into gas turbine 2 and reduce the temperature inside the gas turbine. More specifically, the signal at the output of block 120 is supplied to an interface 125 which powers the electric motors (not shown) governing the position of vane regulators 9.

The error at the output of second comparing block 115 is sent to a proportional-integral (PI) block 130 which generates the sixth control signal P6. More specifically, as the error increases, a decreasing control signal P6 is generated to reduce fuel supply to the combustion chamber and so reduce the temperature in the gas turbine.

Turbine cooling air regulator 40 therefore performs a dual function:
  the error at the output of first comparing block 110
    increases alongside an increase in temperature, and the regulator responds by opening vane regulators 9 to reduce the temperature of turbine 2; and when the above action is no longer effective (vane regulators fully open), the error increase produces, via PI block 130, a reduction in fuel supply to the gas turbine, whose internal temperature is thus reduced.

In actual use, gas turbine 2 is started using the start-up regulator which, in known manner, produces a control signal P2 to start up gas turbine 2. At this step, the control signals from the other regulators are not used.

At the end of the start-up step (indicated by speed exceeding a predetermined threshold), control is taken over by speed/load regulator 30, which first regulates the rotation speed of the gas turbine (selector 62 selects output 60u of block 60) to increase speed to reference value Vref (typically 3000 rpm equal to 50 Hz).

Subsequently, when generator 20 supplies electric power to the mains, control is taken over by regulator 64 which provides for load control.

The present invention, however, provides for load control which is "sensitive" to variations in speed, by error signal ΔN affecting the gain of block 64, modifying the input signal of block 64, and/or going directly to the output of regulator 64 (block 67).

A gas turbine control system is thus achieved which is particularly compact and complete.

Subsequently, control may be taken over by any one of the regulators (temperature regulator 36, compression ratio regulator 38, turbine cooling air regulator 40) requesting it; which request corresponds to a fall in the value of the control signal generated by the respective regulator, so that selecting device 25 selects (and so hands over control of the gas turbine to) that particular regulator. For example, a sharp fall in ambient temperature would produce an increase in air density and in the power generated. Consequently, the power generated by generator 20 would increase sharply, and control signal P3 would decrease until it becomes the lowest of all the signals, thus permitting control of turbine 2 by regulator 34.

What is claimed is:

1. A control system for a gas turbine (2), wherein a number of regulators (24) generate respective control signals (P1–P6) selectable (25) to regulate (27) fuel supply to a combustion chamber (5) of said gas turbine; said regulators comprising at least one speed/load regulator receiving at least one first feedback signal (NT1–NT6, NT) related to the speed of said gas turbine (2), and at least one second feedback signal (PEL1, PEL2, PEL) related to the power supplied by said gas turbine;

characterized in that said speed/load regulator comprises a first regulating block (60), in particular a proportional-integral regulator, receiving a first error signal (ΔN) related to the difference between said first feedback signal (NT1–NT6, NT) and a reference speed value (Vref);

said speed/load regulator also comprising a second regulating block (64), in particular a proportional-integral regulator, separate from the first regulating block (60) and receiving a second error signal (ΔP) related to the difference between said second feedback signal (PEL1, PEL2, PEL) and a reference load value;

said speed/load regulator also comprising selecting means (62) for selecting the output of said first regulating block (60) during a control step of the speed of said gas turbine, and for selecting said second regulating block (64) during a control step of the load of said gas turbine.

2. A system as claimed in claim 1, wherein regulating means (66) are provided for modifying at least one gain parameter of said second regulating block (64) as a function of said first error signal (ΔN) related to the difference between said first feedback signal (NT1–NT6, NT) and a reference speed value (Vref).

3. A system as claimed in claim 1, wherein regulating means are provided for supplying said second regulating block (64) with a signal related to the difference between the second error signal (ΔP) and said first error signal (ΔN).

4. A system as claimed in claim 1, wherein advancing means (67) are provided for supplying a signal, related to said first error signal (ΔN), to the output of said second regulating block (64).

5. A system as claimed in claim 1, wherein speed acquisition means (52) are provided, which receive signals generated by respective rotation sensors (54) fitted to said gas turbine; said speed acquisition means (52) performing the following operations:

each input signal is compared with another input signal, and the lower-value signal is selected;

the highest-value signal is extracted from the selected signals; and the extracted signal represents the output of said speed acquisition means (52), and represents the first feedback signal.

6. A system as claimed in claim 1, wherein electric power acquisition means (44) are provided, which receive signals generated by respective electric power sensors (45, 46) fitted to a generator (20) driven by said gas turbine (2); said electric power acquisition means (44) selecting the highest-value input signal to generate said second feedback signal.

7. A system as claimed in claim 1, wherein a compression ratio regulator (38) is provided, which receives a third feedback signal related to the ratio between the output pressure (Pu) of the compressor of said gas turbine and the input pressure (Pi) of the compressor of said gas turbine; said compression ratio regulator (38) comprising a third regulating block (106), in particular a proportional-integral regulator, which receives a third error signal (βerror) related to the difference between said third feedback signal (β) and a reference compression ratio value; said third regulating block generating a control signal.

8. A system as claimed in claim 7, wherein adding means (108) are provided for supplying a signal, related to the time derivative of said third feedback signal, to the output signal of said third regulating block.

9. A system as claimed in claim 8, wherein a turbine cooling air regulator (40) is provided, which receives said third feedback signal; said turbine cooling air regulator (40) comprising comparing means (115, 110) for comparing said third feedback signal with a maximum value to generate a fourth error signal;

said turbine cooling air regulator (40) also comprising:

a fourth regulating block (130), in particular a proportional-integral regulator, which receives said fourth error signal and generates a control signal; and a function block (120), which receives said fourth error signal and generates a command to position airflow regulators (9) fitted to the compressor of said gas turbine (2).

10. A system as claimed in claim 1, wherein a temperature regulator (36) is provided, which receives a fifth feedback signal related to an output temperature of said gas turbine; said temperature regulator (36) comprising a fifth regulating block (90), in particular a proportional-integral regulator, which receives a fifth error signal related to the difference between said fifth feedback signal and a reference temperature (Tref); said fifth regulating block generating a control signal.

11. A system as claimed in claim 1, wherein a selecting device (25) is provided, which receives the output signals generated by the individual regulators, and supplies the lowest-value input signal to generate a control signal (C(t)) controlling fuel supply to said gas turbine.

* * * * *